United States Patent
Wullenweber (10) Patent No.: US 12,502,093 B2
(45) Date of Patent: Dec. 23, 2025

(54) METHOD FOR DETERMINING A POSITION OF AT LEAST ONE COIL ELEMENT OF A RADIOFREQUENCY COIL THAT CAN BE INSERTED IN A PATIENT PLACEMENT REGION OF A MAGNETIC RESONANCE APPARATUS

(71) Applicant: Siemens Healthineers AG, Forchheim (DE)

(72) Inventor: Michael Wullenweber, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 234 days.

(21) Appl. No.: 18/121,719

(22) Filed: Mar. 15, 2023

(65) Prior Publication Data
US 2023/0293040 A1    Sep. 21, 2023

(30) Foreign Application Priority Data
Mar. 16, 2022    (DE) ...................... 10 2022 202 591.1

(51) Int. Cl.
*A61B 5/06*    (2006.01)
*A61B 5/055*    (2006.01)
(Continued)

(52) U.S. Cl.
CPC .............. *A61B 5/061* (2013.01); *A61B 5/055* (2013.01); *G01R 33/34* (2013.01); *G06T 7/70* (2017.01); *G06T 2207/10088* (2013.01)

(58) Field of Classification Search
CPC ........ A61B 5/055; A61B 5/061; G01R 33/34; G01R 33/3415; G01R 33/3664;
(Continued)

(56) References Cited

U.S. PATENT DOCUMENTS 10,509,085 B2 * 12/2019 Leussler ............ G01R 33/3614
2002/0181753 A1 * 12/2002 Ma ...................... G01R 33/3415
382/131

(Continued)

FOREIGN PATENT DOCUMENTS

DE          10207736 A1    9/2003
DE      102007010274 B4   11/2010

OTHER PUBLICATIONS

Ya-Jun Ma et al., "Improved SENSE Imaging Using Accurate Coil Sensitivity Maps Generated by a Global Magnitude-Phase Fitting Method," 2015, Magnetic Resonance in Medicine, 74, pp. 217-224 (Year: 2015).*

*Primary Examiner* — Michael J Carey
*Assistant Examiner* — Maria Christina Talty
(74) *Attorney, Agent, or Firm* — Banner & Witcoff, Ltd.

(57) ABSTRACT

A technique is provided for determining a position of a coil element of a radiofrequency coil (RF) for placement into a patient placement region of a magnetic resonance (MR) apparatus. A magnetic resonance sequence is output via a radiofrequency (RF) antenna, which is arranged inside a scanner unit of the MR apparatus, first MR data is captured via the RF antenna, and second MR data is captured via the coil element. First MR images are ascertained from the first MR data, and second MR images are ascertained from the first MR data and the second MR data. Moreover, a similarity measure is determined from the first MR images and the second MR images, and an effective range of the coil element is determined from the first MR images and the second MR images. The effective range comprises a position of the coil element of the RF coil.

18 Claims, 3 Drawing Sheets

(51) Int. Cl.
*G01R 33/34* (2006.01)
*G06T 7/70* (2017.01)

(58) Field of Classification Search
CPC ........ G01R 33/543; G06T 2207/10088; G06T 7/70; G06T 7/73
See application file for complete search history.

(56) References Cited

U.S. PATENT DOCUMENTS

| | | | |
|---|---|---|---|
| 2003/0055330 A1* | 3/2003 | King | G01R 33/5611 600/410 |
| 2003/0184292 A1* | 10/2003 | Meyer | G01R 33/3415 324/309 |
| 2008/0007263 A1* | 1/2008 | Machida | G01R 33/3664 324/318 |
| 2008/0211502 A1 | 9/2008 | Arnold et al. | |
| 2020/0279413 A1* | 9/2020 | Wheaton | G06T 5/73 |
| 2021/0121092 A1* | 4/2021 | Kawajiri | A61B 5/055 |

* cited by examiner

FIG 5

METHOD FOR DETERMINING A POSITION OF AT LEAST ONE COIL ELEMENT OF A RADIOFREQUENCY COIL THAT CAN BE INSERTED IN A PATIENT PLACEMENT REGION OF A MAGNETIC RESONANCE APPARATUS

CROSS-REFERENCE TO RELATED APPLICATIONS

The present application claims priority to and the benefit of Germany patent application no. DE 10 2022 202 591.1, filed on Mar. 16, 2022, the contents of which are incorporated herein by reference in their entirety.

TECHNICAL FIELD

The present disclosure relates to a method for determining a position of at least one coil element of a local radiofrequency (RF) coil that can be inserted in a patient placement region of a magnetic resonance apparatus for a magnetic resonance measurement. The present disclosure also relates to a magnetic resonance apparatus comprising a scanner unit having a radiofrequency antenna, and comprising a patient placement region, a local RF coil that can be inserted in the patient placement region, and an analysis unit, wherein the magnetic resonance apparatus is designed to execute the method for determining a position of at least one coil element of the local RF coil that can be inserted in the patient placement region. The disclosure is also based on a computer program product which comprises a program and can be loaded directly into a memory of a programmable control unit, and has program means for controlling, when the program is executed in the control unit, a method for determining a position of at least one coil element of a local RF coil that can be inserted in a patient placement region of a magnetic resonance apparatus, and on an electronically readable data storage medium, on which is stored a corresponding computer program.

BACKGROUND

It is helpful and/or a requirement for different magnetic resonance examinations to know a position of local RF coils and/or of individual coil elements of the local RF coil. This is important in particular when a plurality of local RF coils and/or a local RF coil having a plurality of coil elements are positioned on the patient, and this plurality of local RF coils and/or this plurality of coil elements are meant to be used for different measurements and/or different examination regions. If, for example, MR acquisitions of different organs are made during a magnetic resonance examination on a patient, then it is advantageous to activate only those local RF coils and/or only those coil elements that are spatially especially close to the particular organ of interest. During positioning of the patient and/or of the local RF coils, however, it is not directly evident which local RF coil, in particular which coil elements, are positioned especially close to which organ.

In addition, methods are known that determine the position of a local RF coil. In these methods, however, a center of the local RF coil is determined usually only in the z-direction. In contrast, such a position determination does not comprise information about an orientation and/or an extent in the y-direction and/or in the x-direction.

SUMMARY

The object of the present disclosure is to provide improved automatic determination and/or selection of a coil element and/or of a local RF coil. The object is achieved by the embodiments as discussed throughout the disclosure, including the claims.

The disclosure is based on a method for determining a position of at least one coil element of a local RF coil that can be inserted in a patient placement region of a magnetic resonance apparatus for a magnetic resonance measurement, comprising the following steps:
  outputting a magnetic resonance sequence by means of a RF antenna, which is fixedly arranged inside a scanner unit of the magnetic resonance apparatus; and
  capturing first magnetic resonance data by means of the RF antenna, and capturing second magnetic resonance data by means of the at least one coil element of the local RF coil;
  ascertaining first magnetic resonance images from the first magnetic resonance data, and ascertaining second magnetic resonance data from the first magnetic resonance data and the second magnetic resonance data;
  determining effective range an effective range of the at least one coil element of the local RF coil from the first magnetic resonance images and the second magnetic resonance images, wherein the effective range effective range comprises a position of the at least one coil element of the local RF coil.

The magnetic resonance apparatus e.g. comprises a medical and/or diagnostic magnetic resonance apparatus, which is embodied and/or designed to capture medical and/or diagnostic image data, e.g. medical and/or diagnostic magnetic resonance image data, from a patient. The magnetic resonance apparatus comprises the scanner unit. The scanner unit of the magnetic resonance apparatus e.g. comprises a detector unit, e.g. a magnet unit, for capturing the medical and/or diagnostic image data. Said scanner unit, e.g. the magnet unit, comprises a main magnet, a gradient coil unit, and an RF antenna. The RF antenna is fixedly arranged inside the scanner unit.

The main magnet is configured to generate a homogeneous main magnetic field of a defined magnetic field strength, for instance a magnetic field strength of 3 T or 1.5 T, etc. For instance, the main magnet is configured to generate a strong, homogeneous, and constant main magnetic field. The homogeneous main magnetic field is e.g. located and/or situated within a patient placement region of the magnetic resonance apparatus. The gradient coil unit is configured to generate magnetic field gradients, which are used for spatial encoding during imaging.

The patient placement region is embodied and/or designed to accommodate the patient, e.g. the region of interest of the patient, for a medical magnetic resonance examination. For example, for this purpose, the patient placement region is shaped as a cylinder and/or is enclosed cylindrically by the scanner unit.

Within the patient placement region is e.g. located a field of view (FOV) and/or an isocenter of the magnetic resonance apparatus. The FOV e.g. comprises a capture region of the magnetic resonance apparatus, within which region prevail the conditions for capturing medical image data, e.g. magnetic resonance image data, for instance conditions such as a homogeneous main magnetic field. The isocenter of the magnetic resonance apparatus preferably comprises the region and/or point inside the magnetic resonance apparatus that has the optimum and/or ideal conditions for capturing medical image data, e.g. magnetic resonance image data. For example, the isocenter comprises the most homogeneous magnetic field region inside the magnetic resonance apparatus.

In addition, the magnetic resonance apparatus has a patient positioning apparatus, which is designed for positioning and/or placing the patient for a magnetic resonance examination. Said patient positioning apparatus can comprise a patient table, which is able to be moved into the patient placement region. For a magnetic resonance examination, the patient is positioned on the patient table such that after the patient table has been positioned within the patient placement region, the region of interest is located and/or positioned within the isocenter of the patient placement region.

For a magnetic resonance examination, local radiofrequency (RF) coils are positioned on the patient, e.g. on the region of interest of the patient. These local RF coils often have a plurality of coil elements, which can be selected for capturing magnetic resonance data according to their position with respect to the body region of interest. For instance, the intention here is to select for capturing magnetic resonance data those coil elements of a local RF coil and/or that local RF coil at the shortest distance from the region of interest. An example of a local RF coil having a plurality of coil elements is a local body coil. The local RF coils located on the patient are inserted together with the patient into the patient placement region, e.g. into the isocenter, for the magnetic resonance examination.

The method for determining a position of at least one coil element of a RF coil that can be inserted in the patient placement region of the magnetic resonance apparatus may e.g. be performed before the planned magnetic resonance examination, so that the position of the at least one coil element can be determined for the planned and/or upcoming magnetic resonance examination. For this purpose, the patient together with the local RF coil is already within the patient placement region, e.g. within the isocenter of the magnetic resonance device.

The magnetic resonance sequence used for determining the position of the at least one coil element can be any magnetic resonance sequence, for instance a gradient echo (GRE) sequence. In this process, the first magnetic resonance data is captured solely by means of the RF antenna, which is fixedly arranged inside the scanner unit. The second magnetic resonance data is captured solely by the at least one coil element of the RF coil, e.g. of the local RF coil. If the RF coil, e.g. the local RF coil, has two or more coil elements, second magnetic resonance data can be captured for each of the two or more coil elements and assigned to each particular coil element.

The first magnetic resonance images are ascertained and/or determined solely from the first magnetic resonance data. The second magnetic resonance images are ascertained and/or determined from both the first magnetic resonance data and the second magnetic resonance data. If the RF coil has a plurality of coil elements, different second magnetic resonance data is also ascertained for the different coil elements, and the position is determined separately for each of the coil elements.

For the ascertaining and/or determining of the first magnetic resonance images from the first magnetic resonance data and the ascertaining and/or determining of the second magnetic resonance images from the second magnetic resonance data, the magnetic resonance apparatus has an analysis unit, which is designed to analyze the captured magnetic resonance data, e.g. the first magnetic resonance data and the second magnetic resonance data. In an embodiment, the determining of the effective range of the at least one coil element of the local RF coil from the first magnetic resonance images and the second magnetic resonance images is also implemented by the analysis unit.

The determining of the effective range of the at least one coil element of the RF coil is implemented e.g. in a location-dependent manner in at least one spatial direction, particularly advantageously in a location-dependent manner in all three spatial directions. For the purpose of determining the effective range of the at least one coil element of the RF coil, the first magnetic resonance images are compared with the second magnetic resonance images to ascertain an influence of the at least one coil element of the RF coil in the magnetic resonance data. A comparison of the first magnetic resonance data with the second magnetic resonance data may be e.g. implemented in a location-dependent manner in at least one spatial direction. Then, the analysis unit determines the effective range, e.g. a location-dependent effective range, of the at least one coil element of the RF coil. For example, the comparison of the first magnetic resonance images and the second magnetic resonance images comprises a difference between the first magnetic resonance images and the second magnetic resonance images to determine a match and/or a similarity between the first magnetic resonance images and the second magnetic resonance images.

The effective range indicates at which positions in relation to the RF antenna of the scanner unit and/or in relation to an anatomy of the patient, a coil element of the local RF coil captures magnetic resonance data. A effective range at a position in the at least one spatial direction for the at least one coil element exists when the first magnetic resonance images differ from the second magnetic resonance images at this position in the at least one spatial direction. If the at least one coil element of the local RF coil does not capture any magnetic resonance data for a position in the at least one spatial direction, the second magnetic resonance images are substantially identical to the first magnetic resonance images at this position in the at least one spatial direction, and therefore a location-dependent comparison of the first magnetic resonance images and the second magnetic resonance images does not result in a significant difference.

The analysis unit comprises at least one computing module and/or processor. Thus e.g. the analysis unit is configured to execute computer-readable instructions for analyzing the captured magnetic resonance data and determining the effective range. The analysis unit comprises e.g. a memory unit, in which memory unit is stored computer-readable information, wherein the analysis unit is designed to load the computer-readable information from the memory unit and to execute the computer-readable information in order to analyze the captured magnetic resonance data and determine the effective range.

Most of the components of the analysis unit can be in the form of software components. In principle, however, some of these components can also be implemented in the form of software-aided hardware components, for instance FPGAs or the like, e.g. when especially fast calculations are needed. Likewise, the required interfaces can be designed as software interfaces, for instance if all that is involved is a transfer of data from other software components. They can also be designed, however, as hardware-built interfaces driven by suitable software. Of course, it is also conceivable that a plurality of the specified components are combined in the form of a single software component or software-aided hardware component.

The disclosure can advantageously achieve improved automatic determination and/or selection of a coil element and/or of a local RF coil. For instance, it is thus possible to determine a particularly precise position for the at least one coil element, e.g. for each coil element, of the local RF coil that can be inserted in the patient placement region. This makes it possible to provide for a magnetic resonance examination, position information for the at least one coil element of the local RF coil that goes beyond position information of a center of the local RF coil. In addition, this can also assist a user, e.g. a medical operator, advantageously in selecting the local RF coils and/or the individual coil elements for an upcoming magnetic resonance examination. For example, based on position information provided for the coil elements and/or the RF coils, it is thus particularly easy to select that coil element and/or those coil elements that are at the shortest distance from the region of interest of the patient.

In an advantageous development of the method according to the disclosure, it can be provided that the determining of the effective range of the at least one coil element of the RF coil is implemented in a location-dependent manner in at least one spatial direction. The determining of the effective range of the at least one coil element of the RF coil may be e.g. implemented in a location-dependent manner in all three spatial directions. The capture of the first magnetic resonance data and the capture of the second magnetic resonance data here comprises capturing magnetic resonance data for a plurality of, e.g. successive, slice images in the at least one spatial direction, e.g. in all three spatial directions. N slice images are ascertained and/or determined solely from the first magnetic resonance data from the RF antenna in at least one spatial direction. In an embodiment, N slice images are ascertained and/or determined solely from the first magnetic resonance data from the RF antenna in each of the three spatial directions. The first magnetic resonance images in this case comprise N slice images $SliceBC\_Z_n$, where $1 \leq n \leq N$ in the z-direction, N slice images $SliceBC\_X_n$ where $1 \leq n \leq N$ in the x-direction, and N slice images $SliceBC\_Y_n$ where $1 \leq n \leq N$ in the y-direction.

In addition, N slice images are ascertained and/or determined from the first magnetic resonance data from the RF antenna and from the second magnetic resonance data from the at least one coil element of the RF coil in at least one spatial direction. In an embodiment, N slice images are ascertained and/or determined from the first magnetic resonance data from the RF antenna and from the second magnetic resonance data from the at least one coil element of the RF coil in each of the three spatial directions. The second magnetic resonance data comprises N slice images $SliceLC\_Z_n$ where $1 \leq n \leq N$ in the z-direction, N slice images $SliceLC\_X_n$ where $1 \leq n \leq N$ in the x-direction, and N slice images $SliceBC\_Y_n$ where $1 \leq n \leq N$ in the y-direction, where each of the N slice images $SliceLC\_Z_n$ comprises first magnetic resonance data and second magnetic resonance data at the position $z_n$, each of the N slice images $SliceLC\_X_n$ comprises first magnetic resonance data and second magnetic resonance data at the position $x_n$ and each of the N slice images $SliceLC\_Y_n$ comprises first magnetic resonance data and second magnetic resonance data at the position $y_n$.

This embodiment allows a position of the at least one coil element of the RF coil to be determined particularly precisely in at least one spatial direction, e.g. in all three spatial directions.

In an advantageous development of the method according to the disclosure, it can be provided that for determining the effective range, a similarity measure is calculated, which similarity measure comprises a mean difference between all the pixels of a first magnetic resonance image and all the pixels of a second magnetic resonance image at a position of the at least one spatial direction. Said similarity measure LCI is defined by a mean square difference between all the pixels of a first magnetic resonance image and all the pixels of a second magnetic resonance image as follows:

$$LCI = \sqrt{\sum_{r=1}^{R} \sum_{c=1}^{C} (SliceBC_{r,c} - SliceLC_{r,c})^2}$$

The first magnetic resonance images and also the second magnetic resonance images each have R rows and C columns. The smaller the similarity measure, e.g. the LCI value, the more similar are the first and the second magnetic resonance images. The more similar the first magnetic resonance images and the second magnetic resonance images, the smaller is the influence of the at least one coil element of the RF coil in the capture of magnetic resonance data.

A measure for a divergence and/or for a similarity can be determined advantageously in this way, and hence a measure for determining the effective range, e.g. an extent and/or a position of the effective range, of the at least one coil element of the RF coil, e.g. of the local RF coil, can also be determined.

In an advantageous development of the method according to the disclosure, it can be provided that in at least one spatial direction, a minimum value in the similarity measure and a maximum value in the similarity measure are determined, and if a difference between the maximum value and the minimum value is less than a defined first threshold value, the effective range of the at least one coil element of the local RF coil is set to the value zero.

In accordance with the present embodiment, a similarity measure LCI is determined first from all the first and second magnetic resonance images in the one spatial direction. Then, the minimum value in the similarity measure is determined for the one spatial direction from all the similarity measures LCI, said minimum value in the similarity measure comprising the smallest value for the similarity measure LCI from all the similarity measures LCI in the one spatial direction. In addition, the maximum value in the similarity measure is also determined for the one spatial direction from all the similarity measures LCI, said maximum value in the similarity measure comprising the largest value for the similarity measure LCI from all the similarity measures LCI in the one spatial direction. In accordance with the present embodiment, the determining of a minimum value in the similarity measure and a maximum value in the similarity measure is implemented for all three spatial directions. The defined first threshold value can comprise, for example, half the maximum value in the similarity measure or can comprise other suitable first threshold values considered useful.

It can thereby be determined advantageously whether the at least one coil element of the RF coil overlies an anatomy of the patient, and hence whether also the captured second magnetic resonance data results from the anatomy of the patient or comprises only the noise response of the at least one coil element of the RF coil. If the second magnetic resonance data is not based on an anatomy of the patient, in particular if the at least one coil element of the RF coil does not overlie the anatomy of the patient, the minimum values in the similarity measure and the maximum values in the similarity measure result solely from noise of the coil element. In such a case, the difference between the maximum value in the similarity measure and the minimum value in the similarity measure would be less than the defined first threshold value. Hence, there would also be no effective range for the at least one coil element of the RF coil for the upcoming magnetic resonance examination, and therefore the effective range for the at least one coil element of the RF coil can be set to the value zero. This may be the case, for example, if a RF coil is in an incorrect position and/or is located beside the patient. If, on the other hand, the second magnetic resonance data contains magnetic resonance data resulting from the anatomy of the patient, the difference between a maximum value and a minimum value in the similarity measure is greater than the defined first threshold value, and an effective range for the at least one coil element of the RF coil can be determined.

In an advantageous development of the method according to the disclosure, it can be provided that an effective range for the at least one coil element of the RF coil exists only for those positions in at least one spatial direction if, for these positions in the at least one spatial direction, the similarity measure is greater than a second threshold value. It is thereby possible to determine an effective range e.g. only for those positions in the at least one spatial direction at which the at least one coil element of the RF coil captures a significant signal. This second threshold value ensures that an effective range exists only for those positions of the at least one spatial direction at which the at least one coil element of the RF coil is active and/or is located, i.e. can also capture magnetic resonance data. In regions and/or positions in the at least one spatial direction, in which regions and/or positions the at least one coil element of the RF coil is no longer active and/or the at least one coil element of the RF coil is no longer located and/or positioned, a similarity measure ascertained at this position is also very small and remains below the second threshold value.

This second threshold value can be determined relative to a maximum value in the similarity measure. For example, the second threshold value can be determined from the maximum value in the similarity measure multiplied by a similarity factor. For example, the second threshold value in the z direction can be specified by the formula:

$$SW_z = LCI\_Zmax - LCI\_Factor$$

The LCI_Factor may be 0.05 here, for example. The threshold value can also be determined for the x-direction and the y direction in an analogous manner. If the similarity measure at a position in at least one spatial direction, e.g. in all three spatial directions, is less than the second threshold value, the effective range is set to the value zero for this position.

In an advantageous development of the method according to the disclosure, it can be provided that a smallest position in the at least one spatial direction is determined at which the similarity measure is greater than the second threshold value, and a largest position in the at least one spatial direction is determined at which the similarity measure is greater than the second threshold value, wherein the smallest position and the largest position bound the effective range of the at least one coil element in the at least one spatial direction. The smallest position and the largest position in the at least one spatial direction comprise a spatial bounding and/or extent of the effective range, and hence a spatial bounding and/or extent for the at least one coil element of the RF coil. In an embodiment, a smallest position for the at least one coil element of the RF coil having a similarity measure greater than the second threshold value is determined for all three spatial directions, and a largest position for the at least one coil element of the RF coil having a similarity measure greater than the second threshold value is determined for all three spatial directions, and therefore a spatial extent and/or bounding of the at least one coil element of the RF coil exists and/or can be ascertained for all three spatial directions.

This embodiment of the disclosure has the advantage that in the at least one spatial direction, e.g. in all three spatial directions, precise position information, e.g. a spatial extent, for the at least one coil element of the RF coil can be provided for the upcoming magnetic resonance examination.

In an advantageous development of the method according to the disclosure, there can be provision to provide the effective range of the at least one coil element of the RF coil. The providing of the effective range of the at least one coil element of the RF coil may e.g. be implemented automatically by the analysis unit. The effective range of the at least one coil element of the RF coil can be provided via a user interface to a user for manual selection of a coil element for the upcoming magnetic resonance examination. Alternatively, the effective range of the at least one coil element of the RF coil can be provided also for automatic selection of a coil element.

In an advantageous development of the method according to the disclosure, it can be provided that for a magnetic resonance examination a spatial extent of the effective range of the at least one coil element is overlaid on a field of view and/or a region of interest of the patient. Said overlaying can be performed by a medical operator, for instance at a user interface of the magnetic resonance apparatus. In addition, said overlaying can also be implemented at least in part automatically by means of the analysis unit. In this process, a position of the coil elements in relation to the field of view and/or the region of interest can be determined on the basis of the effective range for the individual coil elements, and taken into account when at least one coil element is selected. It is thereby also easy to select a coil element for a magnetic resonance measurement.

The disclosure is also based on a magnetic resonance apparatus comprising a scanner unit having an RF antenna, and comprising a patient placement region, a local RF coil that can be inserted into the patient placement region, and an analysis unit, wherein the magnetic resonance apparatus is designed to carry out the method for determining a position of at least one coil element of the RF coil that can be inserted into the patient placement region.

It is thereby possible advantageously to achieve improved automatic determination and/or selection of a coil element and/or of a local RF coil for a magnetic resonance examination. In the present embodiment, it is thus possible to determine a particularly precise position for the at least one coil element, e.g. for each coil element, of the local RF coil that can be inserted in the patient placement region. This makes it possible to provide, for a magnetic resonance examination, position information for the at least one coil element of the local RF coil that goes beyond position information of a center of the local RF coil. This also makes it possible to assist a user advantageously in selecting the coil elements for the upcoming magnetic resonance examination.

The advantages of the medical magnetic resonance apparatus according to the disclosure are essentially the same as the advantages detailed above of the method according to the disclosure for determining a position of at least one coil element of a RF coil that can be inserted in a patient placement region of a magnetic resonance apparatus for a magnetic resonance measurement. Features, advantages or alternative embodiments mentioned in this connection can be applied likewise to the other claimed subject matter, and vice versa.

The disclosure is also based on a computer program product which comprises a program and can be loaded directly in a memory of a programmable control unit, and has program means for controlling, when the program is executed in the control unit, a method for determining a position of at least one coil element of a RF coil that can be inserted in a patient placement region of a magnetic resonance apparatus for a magnetic resonance measurement. Said computer program may require program means, e.g. libraries and auxiliary functions, for implementing the relevant embodiments of the method. Said computer program can comprise software containing a source code, which still needs to be compiled and linked or just needs to be interpreted, or an executable software code, which for execution only needs to be loaded into a suitable computing unit.

The computer program product according to the disclosure can be loaded directly into a memory of a programmable computing unit, and comprises program code means in order to execute a method according to the disclosure when the computer program product is executed in the computing unit. The computer program product can be a computer program or comprise a computer program. The method according to the disclosure can thereby be carried out quickly, identically reproducibly, and robustly. The computer program product is configured such that it can use the computing unit to execute the method steps according to the disclosure. The computing unit may have a necessary specification such as, for example, a suitable RAM, a suitable graphics card or a suitable logic unit, etc., to be able to execute the respective method steps efficiently. The computer program product may be stored, for example, on a computer-readable medium or on a network or server, from where it can be loaded into the processor of a local computing unit, which processor can have a direct connection to, or may form part of, the magnetic resonance apparatus.

In addition, control information of the computer program product can be stored on an electronically-readable data storage medium. The control information on the electronically-readable data storage medium can be configured such that it executes a method according to the disclosure when the data storage medium is used in a computing unit. Thus, the computer program product can also constitute the electronically-readable data storage medium. Examples of electronically-readable data storage media are a DVD, a magnetic tape, a hard disk or a USB stick, etc., on which is stored electronically-readable control information, e.g. software (see above). When this control information (e.g. software) is read from the data storage medium and stored in a controller and/or computing unit, any of the embodiments according to the disclosure of the above-described methods can be performed. Hence, the disclosure can also proceed from said computer-readable medium and/or from said electronically-readable data storage medium.

In addition, the disclosure relates to a computer-readable data storage medium, which comprises a program that is intended to execute a method for determining a position of at least one coil element of a local RF coil that can be inserted in a patient placement region of a magnetic resonance apparatus for a magnetic resonance measurement.

BRIEF DESCRIPTION OF THE DRAWINGS

Further advantages, features, and details of the disclosure appear in the exemplary embodiments described herein and with reference to the drawings, in which.

DETAILED DESCRIPTION OF THE DISCLOSURE

Figure 1:
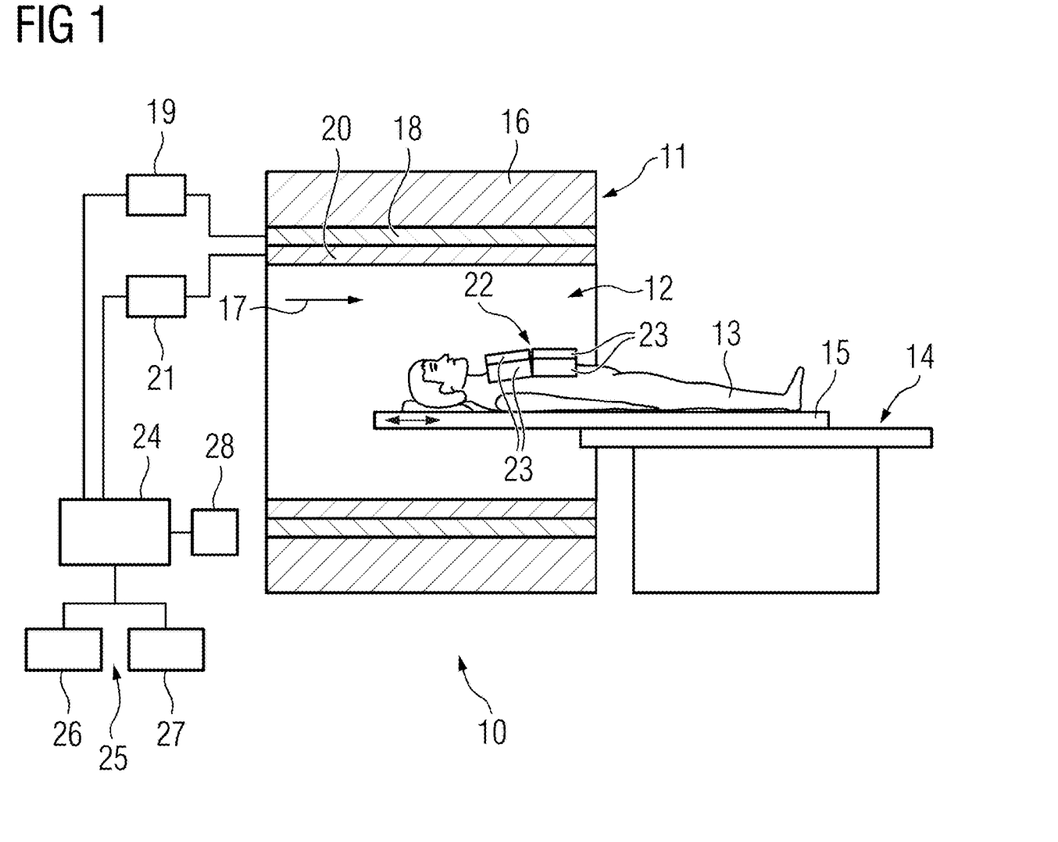
FIG. 1 illustrates a diagram of an example magnetic resonance apparatus according to the disclosure.

FIG. 1 illustrates a diagram of an example magnetic resonance apparatus 10. The magnetic resonance apparatus 10 comprises a scanner unit 11 (also referred to herein as a scanner) formed by a magnet unit (also referred to herein as a magnet assembly). The magnetic resonance apparatus 10 also comprises a patient placement region 12 for accommodating a patient 13. In the present exemplary embodiment, the patient placement region 12 is shaped as a cylinder and is enclosed in a circumferential direction cylindrically by the scanner unit 11, e.g. by the magnet unit. In principle, however, it is conceivable that the patient placement region 12 has a different design. The patient 13 can be moved and/or shifted into the patient placement region 12 by a patient positioning apparatus 14 of the magnetic resonance apparatus 10. The patient positioning apparatus 14 comprises for this purpose a patient table 15, which is designed to be able to move inside the patient placement region 12. For example, said patient table 15 is mounted such that it can move in the direction of a longitudinal extent of the patient placement region 12 and/or in the z-direction.

The scanner unit 11, e.g. the magnet unit, comprises a superconducting main magnet 16 for producing a strong and constant main magnetic field 17. The scanner unit 11, e.g. the magnet unit, further comprises a gradient coil unit (also referred to herein as gradient coil circuitry) 18 for producing magnetic field gradients, which are used for spatial encoding during imaging. The gradient coil unit 18 is controlled by a gradient control unit (also referred to herein as gradient control circuitry or a gradient controller) 19 of the magnetic resonance apparatus 10. The scanner unit 11, e.g. the magnet unit, further comprises an RF antenna 20 for exciting a polarization, which establishes itself in the main magnetic field 17 produced by the main magnet 16. The RF antenna 20 is controlled by a RF-antenna control unit (also referred to herein as RF-antenna control circuitry or an RF-antenna controller) 21 of the magnetic resonance apparatus 10 and radiates high-frequency magnetic resonance sequences into the patient placement region 12 of the magnetic resonance apparatus 10. The RF antenna 20 is fixedly arranged inside the scanner unit 11.

In addition, the magnetic resonance apparatus 10 has a local RF coil 22, which comprises at least one coil element 23. For a magnetic resonance examination, the local RF coil 22 can be mounted on the patient 13 in the patient placement region 12. The local RF coil 22 can have just a single coil element 23 or have two or more coil elements 23. Magnetic resonance data is captured by the local RF coil 22 during a magnetic resonance examination. For this purpose, the local RF coil 22 is located and/or positioned around the region of interest of the patient 13. In addition, the local RF coil 22 can also be customized to the region of interest of patients 13, as is the case for instance in a local head RF coil and/or a local knee RF coil.

The magnetic resonance apparatus 10 has a system control unit (also referred to herein as system control circuitry or a system controller) 24 for controlling the main magnet 16, the gradient control unit 19, and the RF-antenna control unit 21. The system control unit 24 centrally controls the magnetic resonance apparatus 10, for instance implementing a predetermined imaging gradient echo sequence. In addition, the system control unit 24 comprises analysis software (not presented in further detail) for analyzing medical image data acquired during the magnetic resonance examination.

The magnetic resonance apparatus 10 further comprises a user interface 25, which is connected to the system control unit 24. Control information such as imaging parameters, for instance, and reconstructed magnetic resonance images can be displayed to a medical operator on a display unit 26, for example on at least one monitor, of the user interface 25. In addition, the user interface 25 comprises an input unit (also referred to herein as input circuitry, an input interface, or an input) 27, which can be used by the medical operator to enter information and/or parameters during a measurement process.

The magnetic resonance apparatus 10 shown can obviously comprise further components that are typically present in magnetic resonance apparatuses 10. Furthermore, since a person skilled in the art knows how a magnetic resonance apparatus 10 works in general, a detailed description of the further components is not provided.

Figure 2:
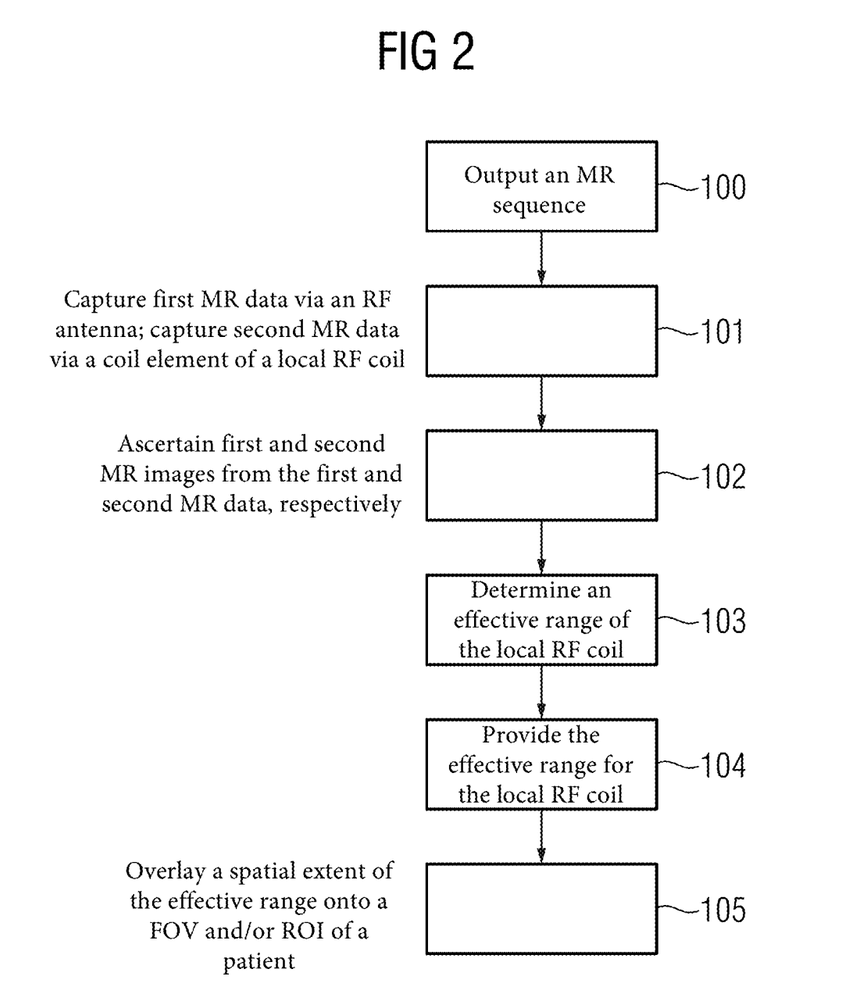
FIG. 2 illustrates an example method according to the disclosure for determining a position of at least one coil element of a local RF (RF) coil that can be inserted in a patient placement region of the magnetic resonance apparatus for a magnetic resonance measurement.

FIG. 2 illustrates an example method according to the disclosure for determining a position of at least one coil element of a local radiofrequency (RF) coil that can be inserted in a patient placement region of the magnetic resonance apparatus for a magnetic resonance measurement. FIG. 2 shows schematically a method for determining a position of at least one coil element 23 of a local RF coil 22 that can be inserted in the patient placement region 12 of the magnetic resonance apparatus 10 for a magnetic resonance measurement. For execution of the method, the patient 13 is already positioned on the patient positioning apparatus 14, e.g. on the patient table 15 of the patient positioning apparatus 14. In addition, all the local RF coils 22 required for the upcoming magnetic resonance examination are already positioned on the patient 13, e.g. around the region and/or regions of interest of the patient 13. Furthermore, the patient 13, together with the local RF coils 22, is already inside the patient placement region 12. In an embodiment, the region of interest of the patient 13 is already located inside the FOV of the patient placement region 12.

For executing the method, the magnetic resonance apparatus 10 also has an analysis unit (also referred to herein as analysis processing circuitry or an analyzer) 28. The analysis unit 28 in the present exemplary embodiment is separate from the system control unit 24. In an alternative embodiment of the magnetic resonance apparatus 10, the system control unit 24 can also comprise the analysis unit 28. For executing and/or controlling the method, the analysis unit 28 has analysis software and control software, which is stored in a memory unit (not presented in further detail) of the analysis unit 28. In addition, in an alternative embodiment of the analysis unit 28, the memory unit can also be separate from the analysis unit 28, for example in the form of an external electronically-readable data storage medium. For executing and/or controlling the method, the analysis unit 28 also has a processor and/or a computing module, which executes the relevant analysis software and control software.

In a first method step 100 of the method according to the disclosure, a magnetic resonance sequence is output by the RF antenna 20 of the scanner unit 11. The magnetic resonance sequence used may be any suitable magnetic resonance sequence, for instance a GRE sequence.

In a second method step 101, which follows the first method step 100, first magnetic resonance data is captured by the RF antenna 20 of the scanner unit 11, and second magnetic resonance data is captured by the at least one coil element 23 of the local RF coil 22. The first magnetic resonance data is captured solely by the radiofrequency antenna 20 of the scanner unit 11. The second magnetic resonance data is captured solely by the at least one coil element 23 of the local RF coil 22. The capture of the first magnetic resonance data and the capture of the second magnetic resonance data here comprises capturing magnetic resonance data for a plurality of, e.g. successive, slice images in at least one spatial direction x, y, z, e.g. in all three spatial directions x, y, z.

In a subsequent further third method step 102, first magnetic resonance images are ascertained and/or determined from the first magnetic resonance data, and second magnetic resonance images are ascertained and/or determined from the first magnetic resonance data and the second magnetic resonance data. The first magnetic resonance images are determined solely from the first magnetic resonance data. N slice images are ascertained and/or determined solely from the first magnetic resonance data from the radiofrequency antenna 20 in each of the three spatial directions. The first magnetic resonance images comprise N slice images SliceBC_$Z_n$ where $1 \leq n \leq N$ in the z-direction, N slice images SliceBC_$X_n$ where $1 \leq n \leq N$ in the x-direction, and N slice images SliceBC_$Y_n$ where $1 \leq n \leq N$ in the y-direction, where each of the N slice images SliceBC_$Z_n$ comprises first magnetic resonance data at the position $z_n$, each of the N slice images SliceBC_$X_n$ comprises first magnetic resonance data at the position $x_n$, and each of the N slice images SliceBC_$Y_n$ comprises first magnetic resonance data at the position $y_n$.

In addition, N slice images are ascertained and/or determined from the first magnetic resonance data from the RF antenna 20 and from the second magnetic resonance data from the at least one coil element 23 of the local RF coil 22, e.g. in all three spatial directions x, y, z. The second magnetic resonance images always comprise first magnetic resonance data and second magnetic resonance data. The second magnetic resonance data comprises N slice images SliceLC_$Z_n$, where $1 \leq n \leq N$ in the z-direction, N slice images SliceLC_$X_n$, where $1 \leq n \leq N$ in the x-direction, and N slice images SliceBC_$Y_n$, where $1 \leq n \leq N$ in the y-direction, where each of the N slice images SliceLC_$Z_n$ comprises first magnetic resonance data and second magnetic resonance data at the position $z_n$, each of the N slice images SliceLC_$X_n$ comprises first magnetic resonance data and second magnetic resonance data at the position $x_n$, and each of the N slice images SliceLC_$Y_n$ comprises first magnetic resonance data and second magnetic resonance data at the position $y_n$.

Figure 3:
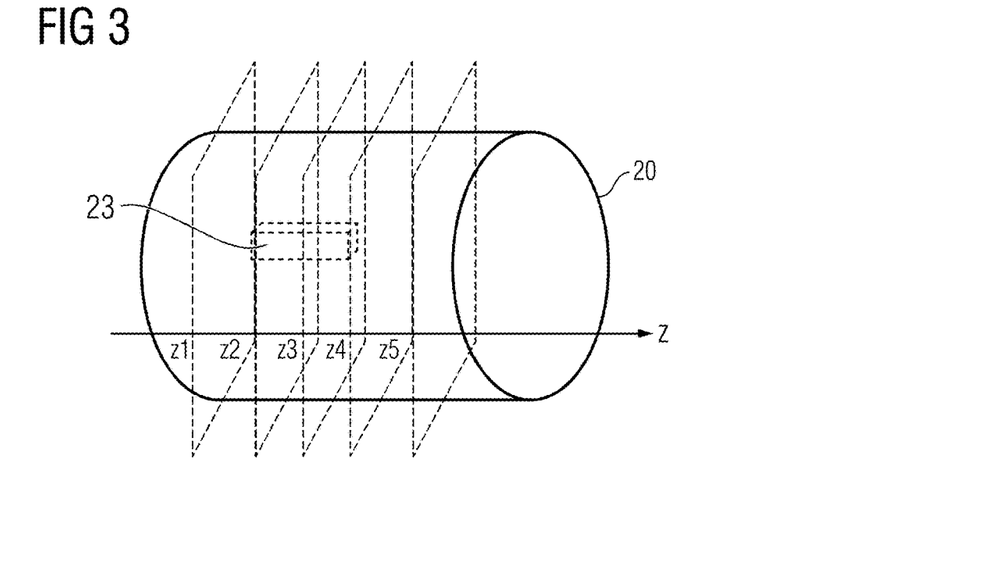
FIG. 3 illustrates a diagram of an example arrangement of an RF antenna having a coil element of a local RF coil for capturing magnetic resonance data.

FIG. 3 illustrates a diagram of an example arrangement of an RF antenna having a coil element of a local RF coil for capturing magnetic resonance data. FIG. 3 shows schematically the RF antenna 20 and a coil element 23 of the local RF coil 22. In this exemplary embodiment, five slice images are captured in the z-direction at the positions z1, z2, z3, z4, z5 by means of the RF antenna 20 of the scanner unit 11, and five slice images at the positions z1, z2, z3, z4, z5 by means of the coil element 23 of the local RF coil 22.

Figure 4:
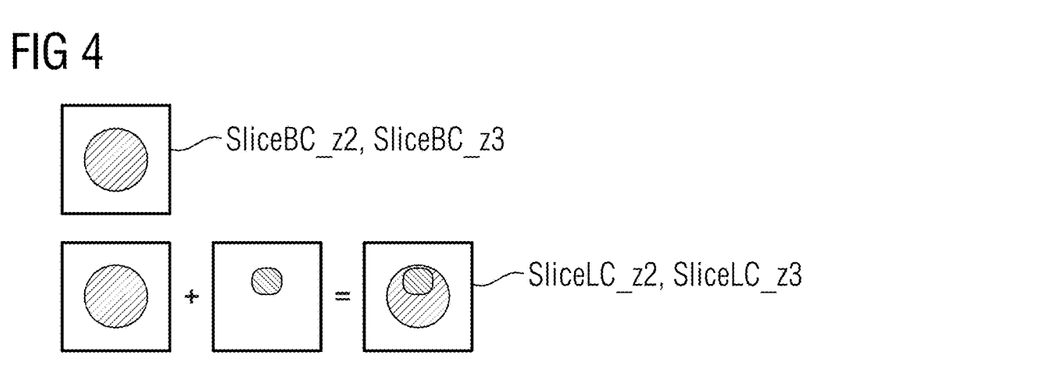
FIG. 4 illustrates example slice images from first magnetic resonance data and second magnetic resonance data in the effective range of the coil element.
Figure 5:
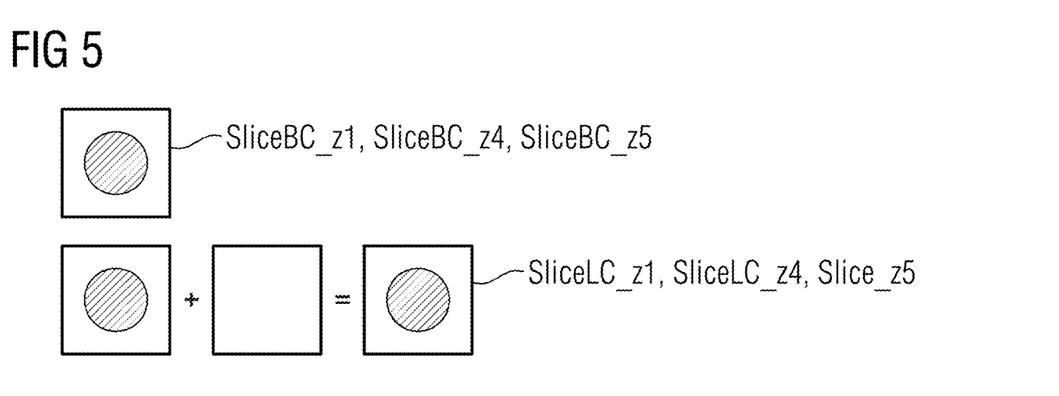
FIG. 5 illustrates example slice images from first magnetic resonance data and second magnetic resonance data outside the effective range of the coil element.

FIG. 4 shows, for the positions z2 and z3, the second magnetic resonance images in the region of influence of the coil element 23 of the local RF coil 22. FIG. 5 shows for the positions z1, z4 and z5 the second magnetic resonance images outside the region of influence of the coil element 23 of the local RF coil 22.

In a subsequent further, fourth, method step 103, an effective range of the at least one coil element 23 of the RF coil 22 is determined by the analysis unit 28 from the first magnetic resonance images and the second magnetic resonance images. The effective range of the at least one coil element 23 of the local RF coil 22 is e.g. determined in a location-dependent manner in all three spatial directions x, y, z. For the purpose of determining the effective range of the at least one coil element 23 of the local RF coil 22, the first magnetic resonance images, for example, are compared with the second magnetic resonance images, and/or a difference is formed between the first magnetic resonance images and the second magnetic resonance images, in order to ascertain an influence, e.g. a location-dependent influence, of the at least one coil element 23 of the local RF coil 22 in the magnetic resonance data.

For the purpose of determining the effective range, in this fourth method step 103 a similarity measure LCI is calculated, which similarity measure LCI comprises a mean difference between all the pixels of the first magnetic resonance image and all the pixels of the second magnetic resonance image at a position in a spatial direction x, y, z. In an embodiment, said similarity measure LCI is calculated and/or determined in all three spatial directions x, y, z for all the positions for which first magnetic resonance data and second magnetic resonance data have been captured.

The similarity measure LCI is defined as follows:

$$LCI = \sqrt{\sum_{r=1}^{R} \sum_{c=1}^{C} (SliceBC_{r,c} - SliceLC_{r,c})^2}$$

The first magnetic resonance images and also the second magnetic resonance images each have R rows and C columns. The smaller the similarity measure LCI and/or the LCI value, the more similar are the first and the second magnetic resonance images, as FIG. 5 also illustrates. The more similar the first magnetic resonance images and the second magnetic resonance images, the smaller is the influence of the second magnetic resonance data from the at least one coil element 23 of the local RF coil 22 in determining the similarity measure LCI.

Then, in this fourth step 103, the minimum value in the similarity measure $LCI_{min}$ is determined for each of the three spatial directions x, y, z from all the similarity measures LCI, said minimum value in the similarity measure $LCI_{min}$ comprising the smallest value for the similarity measure LCI from all the similarity measures LCI for the individual spatial directions x, y, z. In addition, the maximum value in the similarity measure $LCI_{max}$ is also determined for each of the three spatial directions x, y, z from all the similarity measures LCI, said maximum value in the similarity measure $LCI_{max}$ comprising the largest value for the similarity measure LCI from all the similarity measures LCI for the individual spatial directions x, y, z. Furthermore, a difference between the maximum value in the similarity measure $LCI_{max}$ and the minimum value in the similarity measure $LCI_{min}$ is determined for each spatial direction x, y, z. If the difference between the maximum value in the similarity measure $LCI_{max}$ and the minimum value in the similarity measure $LCI_{min}$ is less than a defined first threshold value, the effective range, e.g. the entire effective range, of the at least one coil element 23 of the local RF coil 22 is thereupon set to the value zero. The defined first threshold value can comprise, for example, half the maximum value in the similarity measure $LCI_{max}$.

If the second magnetic resonance data is not based on an anatomy of the patient 13, e.g. if the at least one coil element 23 of the local RF coil 22 does not overlie the anatomy of the patient 13, e.g. if the local RF coil 22 is incorrectly positioned, the minimum values in the similarity measure $LCI_{min}$ and the maximum values in the similarity measure $LCI_{max}$ result solely from noise. In such a case, the difference between the maximum value in the similarity measure $LCI_{max}$ and the minimum value in the similarity measure $LCI_{min}$ would be less than the defined first threshold value, and the entire effective range for the at least one coil element 23 of the local RF coil 22 is set to the value zero.

If the difference of maximum value in the similarity measure $LCI_{max}$ and minimum value in the similarity measure $LCI_{min}$ is greater than the first threshold value, in this fourth method step 103 the similarity measure LCI for all the positions in each spatial direction x, y, z is compared with a second threshold value SW. Only if the similarity measure LCI at a position is greater than the second threshold value SW does the effective range for the at least one coil element 23 of the local RF coil 22 exist for that position. The second threshold value SW is determined in this exemplary embodiment relative to a maximum value in the similarity measure $LCI_{max}$. The second threshold value SW is determined from the maximum value in the similarity measure $LCI_{max}$ multiplied by a similarity factor LCI_Factor, where the similarity factor LCI_Factor may comprise any suitable value, e.g. the value 0.05. For example, the second threshold value SW in the z-direction is thus defined by:

$$SWz = LCImax \cdot LCI\_Factor$$

The second threshold value SW can also be determined for the x-direction and the y-direction in an analogous manner. If the similarity measure LCI at a position in one of the three spatial directions x, y, z is less than the second threshold value SW, the effective range is set to the value zero for this position. A effective range may thus e.g. be determined only for those positions in the three spatial directions x, y, z at which the at least one coil element of the local RF coil 22 captures a significant signal. This second threshold value SW ensures that an effective range exists only for those positions of the spatial directions x, y, z at which the at least one coil element 23 of the local RF coil 22 is active, i.e. can also capture magnetic resonance data. As FIGS. 3 to 5 illustrate, the similarity measure LCI would hence be above the second threshold value SW only for the positions z2 and z3, because the coil element 23 of the local RF coil 22 here contributes a significant signal for determining the similarity measure LCI, and hence an effective range exists for the coil element 23 of the local RF coil 22. On the other hand, in this exemplary embodiment, the similarity measure LCI would be below the second threshold value SW at the positions z1, z4 and z5 because the coil element 23 of the local RF coil 22 is not contributing a significant signal for determining the similarity measure LCI, and hence an effective range does not exist for the coil element 23 of the local RF coil 22.

Then in this fourth method step 103, a smallest position $x_{min}$, $y_{min}$, $z_{min}$ is determined for each of the three spatial directions x, y, z at which the similarity measure LCI is greater than the second threshold value SW. In addition, a largest position $x_{max}$, $y_{max}$, $z_{max}$ is also determined for each of the three spatial directions x, y, z at which the similarity measure LCI is greater than the second threshold value SW. Said smallest position $x_{min}$, $y_{min}$, $z_{min}$ and said largest position $x_{max}$, $y_{max}$, $z_{max}$ bound the effective range of the at least one coil element 23 of the local RF coil 22 in each of the three spatial directions x, y, z. The smallest positions $x_{min}$, $y_{min}$, $z_{min}$ and the largest positions $x_{max}$, $y_{max}$, $z_{max}$ determine for all three spatial directions x, y, z a spatial extent and/or bounding of the effective range, and thereby also determine and/or ascertain a spatial extent and/or bounding and/or a position for the at least one coil element 23 of the local RF coil 22.

If the local RF coil 22 has more than one coil element 23, the method is performed for each of the coil elements 23 of the local RF coil 22 for determining the position. If for a magnetic resonance measurement a plurality of local RF coils 22 are located on the patient 13, the method is performed for each local RF coil 22 and/or each coil element 23 of the plurality of local RF coils 22 for determining the position.

In a further, fifth, method step 104, the effective range for the at least one coil element 23 of the local RF coil 22 is provided. In particular, a position and/or an extent of the at least one coil element 23 of the local RF coil 22 is provided. The providing of the effective range of the at least one coil element 23 of the local RF coil 22 can be implemented, for example, automatically by the analysis unit 28. The effective range of the at least one coil element 23 of the local RF coil 22 can be provided via the user interface 25 to a user for manual selection of a coil element 23 for the upcoming magnetic resonance examination. Alternatively, the effective range of the at least one coil element 23 of the local RF coil 22 can be provided also for automatic selection of a coil element 23.

In a further, optional, sixth method step 105, for the upcoming magnetic resonance measurement, a spatial extent of the effective range of the at least one coil element 23 of the local RF coil 22 is overlaid on a FOV and/or the region of interest of the patient 13. Said overlaying can be performed by a medical operator, for instance at the user interface 25 of the magnetic resonance apparatus 10. In addition, said overlaying can also be implemented at least in part automatically by means of the analysis unit 28. If said overlaying of the effective range of the at least one coil element 23 of the local RF coil 22 on the FOV and/or the region of interest of the patient 13 results in a correspondence in the positions, the at least one coil element 23 of the local RF coil 22 can be selected for the upcoming magnetic resonance measurement.

Although the disclosure has been illustrated and described in detail using the preferred exemplary embodiment, the disclosure is not limited by the disclosed examples, and a person skilled in the art can derive other variations therefrom without departing from the scope of protection of the disclosure The various components described herein may be referred to as "units." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, as applicable and relevant, may alternatively be referred to herein as "circuitry," "controllers," "processors," or "processing circuitry," or alternatively as noted herein.

What is claimed is:

1. A method for determining a position of a coil element of a local radiofrequency (RF) coil that is insertable into a patient placement region of a magnetic resonance (MR) apparatus for performing an MR measurement, the method comprising:

outputting, via an RF antenna, an MR sequence, the RF antenna being fixedly arranged inside a scanner of the MR apparatus;

capturing, based upon the MR sequence, first MR data via the RF antenna;

capturing, based upon the MR sequence, second MR data via the coil element of the local RF coil;

determining first MR images from the first MR data;

determining second MR images from the first MR data and the second MR data; and determining an effective range of the coil element of the local RF coil based upon a comparison of differences between the first MR images and the second MR images, wherein the effective range comprises a position of the coil element of the local RF coil with respect to the RF antenna at which the coil element of the local RF coil captures the second MR data.

2. The method as claimed in claim 1, wherein the determining the effective range of the coil element of the local RF coil comprises determining the effective range in a location-dependent manner in a spatial direction.

3. The method as claimed in claim 2, wherein the capturing the first MR data and capturing the second MR data each respectively comprises capturing MR data for a plurality of slice images in the spatial direction.

4. The method as claimed in claim 2, wherein the determining the effective range of the coil element of the local RF coil comprises:

calculating a similarity measure comprising a mean square difference between each pixel identified with one of the first MR images and each respective pixel identified with one of the second MR images at a position of the spatial direction.

5. The method as claimed in claim 4, further comprising:

determining, in the spatial direction, a minimum value in the similarity measure and a maximum value in the similarity measure; and when a difference between the maximum value and the minimum value is less than a predefined first threshold value, calculating the effective range of the coil element of the local RF coil as a value of zero.

6. The method as claimed in claim 5, wherein the effective range of the coil element of the local RF coil exists only for positions in the spatial direction at which the similarity measure is greater than a predefined second threshold value.

7. The method as claimed in claim 6, further comprising:

determining (i) a smallest position in the spatial direction at which the similarity measure is greater than the second threshold value, and (ii) a largest position in the spatial direction at which the similarity measure is greater than the second threshold value, wherein the smallest position and the largest position bound the effective range of the coil element of the local RF coil in the spatial direction.

8. The method as claimed in claim 1, further comprising:

outputting the effective range of the coil element of the local RF coil.

9. The method as claimed in claim 1, further comprising:
performing the MR measurement by overlaying a spatial extent of the effective range of the coil element of the local RF coil onto a field of view and/or a region of interest of a patient.

10. A magnetic resonance (MR) apparatus, comprising:
a scanner;
a radiofrequency (RF) antenna configured to output an MR sequence, the RF antenna being fixedly arranged inside the scanner;
a patient placement region;
a local RF coil that is insertable into the patient placement region; and
analysis processing circuitry configured to:
    capture, based upon the MR sequence, first MR data via the RF antenna;
    capture, based upon the MR sequence, second MR data via a coil element of the local RF coil;
    determine first MR images from the first MR data;
    determine second MR images from the first MR data and the second MR data; and
    determine an effective range of the coil element of the local RF coil based upon a comparison of differences between the first MR images and the second MR images,
wherein the effective range comprises a position of the coil element of the local RF coil with respect to the RF antenna at which the coil element of the local RF coil captures the second MR data.

11. A non-transitory data storage medium having electronically-readable control information stored thereon that, when executed via processing circuitry of a magnetic resonance (MR) apparatus, cause the MR apparatus to determine a position of a coil element of a local radiofrequency (RF) coil that is insertable into a patient placement region of the MR apparatus by:
    outputting, via an RF antenna, an MR sequence, the RF antenna being fixedly arranged inside a scanner of the MR apparatus;
    capturing, based upon the MR sequence, first MR data via the RF antenna;
    capturing, based upon the MR sequence, second MR data via the coil element of the local RF coil;
    determining first MR images from the first MR data;
    determining second MR images from the first MR data and the second MR data; and
    determining an effective range of the coil element of the local RF coil based upon a comparison of differences between the first MR images and the second MR images,
wherein the effective range comprises a position of the coil element of the local RF coil with respect to the RF antenna at which the coil element of the local RF coil captures the second MR data.

12. The method of claim 1, wherein the determining the effective range of the coil element of the local RF coil comprises determining a position in a spatial direction at which the first MR images differ from the second MR images.

13. The method of claim 1, wherein the capturing the first MR data comprises capturing the first MR data solely via the RF antenna, and
    wherein the capturing the second MR data comprises capturing the second MR data solely via the coil element of the local RF coil.

14. The method of claim 1, wherein the determining the effective range of the coil element of the local RF coil comprises comparing the first and the second MR images to determine an influence of the coil element of the local RF coil in the second MR data.

15. The method of claim 14, further comprising:
calculating a similarity measure comprising a mean square difference between each pixel identified with one of the first MR images and each respective pixel identified with one of the second MR images at a position of a spatial direction,
    wherein the influence of the coil element of the local RF coil in the second MR data is proportional to the similarity measure.

16. The method of claim 4, wherein the first and the second MR data are captured in each one of three spatial and orthogonal directions that include the spatial direction, and
    wherein the determining the effective range of the coil element of the local RF coil comprises calculating the similarity measure comprising a mean square difference between each pixel identified with the one of the first MR images and each respective pixel identified with the one of the second MR images at a position of each one of the three spatial and orthogonal directions.

17. The method as claimed in claim 1, wherein the determining the effective range of the coil element of the local RF coil comprises performing a pixel-to-pixel comparison between pixels identified with one of the first MR images and each respective pixel identified with one of the second MR images.

18. The method as claimed in claim 17, wherein the determining the effective range of the coil element of the local RF coil comprises determining, based upon the pixel-to-pixel comparison, a contribution of the coil element with respect to capturing the second MR data used to determine the one of the second MR images.

* * * * *